United States Patent [19]

Tattermusch et al.

[11] Patent Number: 4,703,947
[45] Date of Patent: Nov. 3, 1987

[54] STABILIZER ARRANGEMENT FOR DRIVABLE MOTOR VEHICLE AXLES WITH INDEPENDENT WHEEL SUSPENSIONS

[75] Inventors: Peter Tattermusch, Esslingen; Ulrich Zech, Stuttgart, both of Fed. Rep. of Germany

[73] Assignee: Daimler-Benz Aktiengesellschaft, Stuttgart, Fed. Rep. of Germany

[21] Appl. No.: 830,922

[22] Filed: Feb. 19, 1986

[30] Foreign Application Priority Data

Feb. 19, 1985 [DE] Fed. Rep. of Germany ....... 3505621

[51] Int. Cl.$^4$ ................................................ B60G 3/00
[52] U.S. Cl. ..................................... 280/689; 280/665; 280/700; 280/721
[58] Field of Search ............... 280/689, 701, 688, 690, 280/665, 700, 717, 721

[56] References Cited

U.S. PATENT DOCUMENTS

| 2,961,253 | 11/1960 | Allison | 280/665 |
| 4,113,278 | 9/1978 | Rissberger | 280/689 |
| 4,474,389 | 10/1984 | Ohe | 280/701 |
| 4,550,932 | 11/1985 | Vilain | 280/689 |

OTHER PUBLICATIONS

Publication, "Sieben Prinzipien fielen durch", published Jun. 16, 1983.

*Primary Examiner*—Richard A. Bertsch

[57] ABSTRACT

This invention relates to an arrangement of a torsion bar stabilizer at a drivable motor vehicle axle with independent wheel suspensions, the wheels of which being guided by means of a plurality of individual links.

By means of this arrangement, a housing of the torsion bar stabilizer between the axle and the vehicle body is made to require little space in upward direction. The assignment of the stabilizer legs to the wheel carriers also do not force a limitation of the rim of tire width of the vehicle wheels. According to the invention, this is achieved by the fact that the legs of a U-shaped torsion bar stabilizer are in each case arranged between a camber strut and the axle shaft of the wheel suspensions. Thus the stabilizer legs are located inside the wheel suspensions or behind their wheel carriers and no longer project over the same in an upward direction. In this case, the stabilizer legs can be moved close to the wheel carriers and as a result, the transmission of the torsion bar stabilizer can be optimally designed.

5 Claims, 2 Drawing Figures

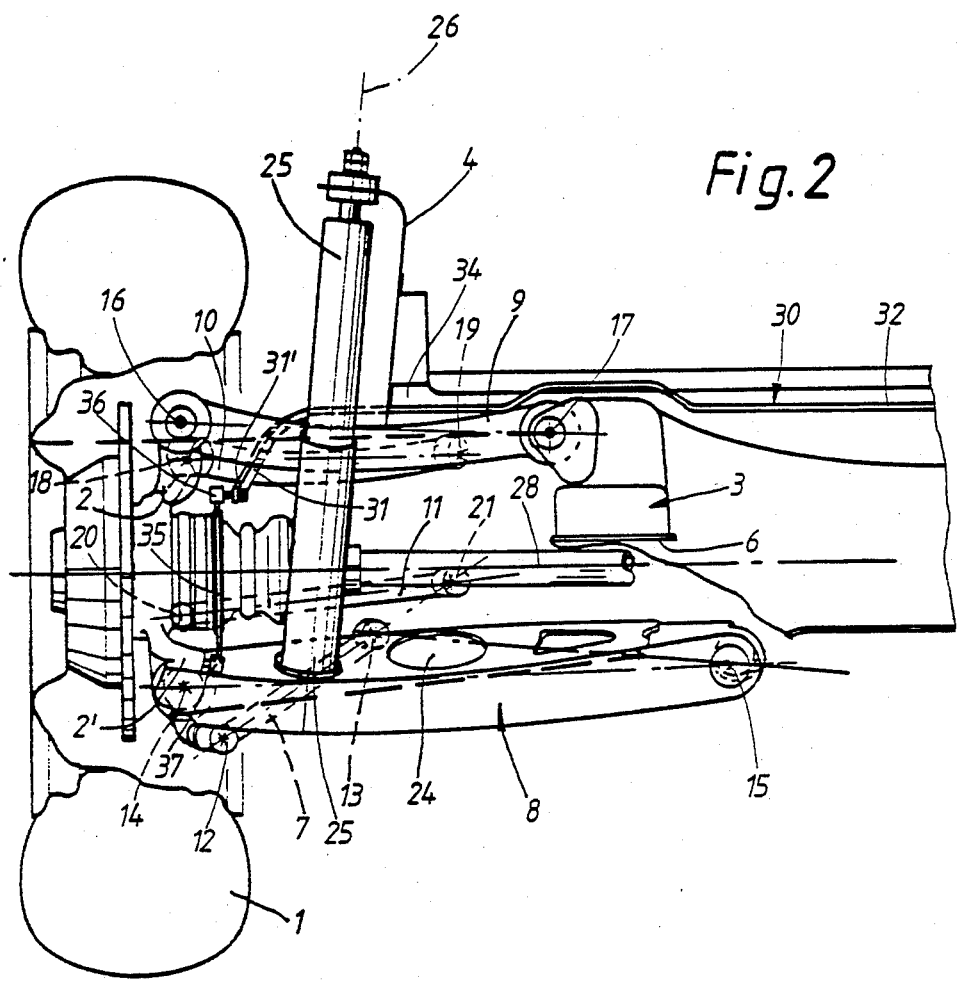

STABILIZER ARRANGEMENT FOR DRIVABLE MOTOR VEHICLE AXLES WITH INDEPENDENT WHEEL SUSPENSIONS

BACKGROUND AND SUMMARY OF THE INVENTION

This invention relates generally to a stabilizer arrangement, and more specifically, for motor vehicles axles having wheels with independent wheel suspensions.

In *Automobil-Revue*. No. 25, June 16, 1983, page 43, a vehicle axle having a stabilizer arrangement known as a space link axle is shown. In this motor vehicle axle, a torsion bar stabilizer is arranged above wheel carriers supporting respective links of wheel suspensions or is positioned between the wheel carriers and the vehicle body. U-shaped legs of the torsion bar stabilizer cross above a camber strut of the respective wheel suspension, and are further movably supported at one of the lower spring links of the wheel suspensions.

In this arrangement, a distance is left on top between the camber strut and torsion bar stabilizer so that these parts do not come in contact with one another in the case of the maximally possible compression movements of the wheel carriers. However, in order to be able to keep this distance as small as possible or keep the projection of the U-shaped legs over the wheel suspension as small as possible, the U-shaped legs cross the camber struts at a large lateral distance from the respective wheel carrier, and thus, cross in an area in which the upper edge of the camber links during their compression movement still covers a relatively short path in the direction of the stabilizer leg.

The U-shaped legs are supported at the lower spring link of the wheel suspensions for achieving an advantageous transmission ratio at the torsion bar stabilizer. This arrangement of the camber struts and torsion bar stabilizer legs for achieving this, however, requires a bending of a free end piece of the torsion bar stabilizer legs in the direction of the wheel carrier. This is so in order to be able to provide the supporting point on the side of a control arm as closely as possible to the wheel carrier.

The lateral distance of the U-shaped legs from the respective adjacent wheel carrier, however, must not be displaced arbitrarily far away from the coupling point of the camber strut on the side of the wheel carrier because a coil spring as well as a shock absorber are supported on the lower spring links, the shock absorber being positioned between the coil spring and the wheel carrier. The torsion bar stabilizer must, therefore, be designed in such a way that the stabilizer legs also do not touch the shock absorbers during the maximum compression of the wheel suspensions.

This requires an arrangement of the stabilizer legs relative to the wheel carriers such that the legs, with their partial leg piece projecting in upward direction beyond the assigned wheel carrier, are located in an area relative to an inner rim flange or to an inner tire wall of the vehicle wheel carried by the wheel carrier, thereby resulting in limiting the tire or the rim width.

It is, therefore, an object of this invention to provide a more compact mutual arrangement of the axle and the torsion bar stabilizer.

It is further an object of this invention to arrange the torsion bar stabilizer in such a way that it is no longer necessary to provide its legs above the camber struts.

It is still another object of this invention to provide a lateral distance of the stabilizer legs from the wheel carriers such that the selection of the wheel or tire width is independent of this distance.

It is still further an object of this invention to provide an improved transmission ratio of the stabilizer irrespective of the wheel or tire width.

The above and other objects are attained by a stabilizer arrangement for motor vehicle axles for wheels having independent wheel suspensions constructed in accordance with preferred embodiments of the invention. The arrangement includes a wheel carrier and a plurality of guiding links for guiding the wheel carrier. A lower spring link and an upper camber strut provide two of the guiding links, whereby an axle shaft is arranged above the carrier link between the two links. The axle shaft, camber strut, and lower spring link extend in a transverse direction of the vehicle. The suspension includes a carrying spring and shock absorber, both arranged on the lower spring link.

A U-shaped torsion bar stabilizer is pivoted at a body portion of the motor vehicle with a bar portion located in transverse direction. The stabilizer includes legs arranged at a higher level than the axle shafts and in an area close to the respective wheels. The legs are connected between the wheel carrier and the shock absorber, with the camber strut and the lower spring link arranged to cross the legs.

A third guiding link or tension strut, is substantially parallel with a partial section of the legs. The legs are further arranged between the camber strut and the axle shaft such that they are adjacent to the same at approximately their level.

The legs of the torsion bar stabilizer, therefore, extend between a camber strut and an axle shaft at a vertical distance to these parts resulting in the integration of the legs into the link arrangement of the wheel suspensions. Thus, in certain preferred embodiments, the stabilizer legs above the camber struts no longer project laterally upwards beyond the wheel carriers, but can be led between the camber struts and the axle shaft close to the corresponding wheel carrier. Thus they are located in an area behind the wheel carrier which is located within the rim of the vehicle wheel where they can be fastened.

The present invention also allows for the selection of a suitable wheel width independent of the torsion bar stabilizer. In addition, the distance between the axle and the vehicle body can be reduced correspondingly.

Because of the relatively large upward distance between the camber strut and the axle shaft, the legs of the torsion bar stabilizer can be moved in a preferred embodiment very close to the wheel carrier, thereby offering the advantage of a significantly improved transmission of the torsion bar stabilizer. This is because of the fact that between the pivotal point of the lower spring links on the side of the body, and the supporting point of the stabilizer legs on the side of the wheel carrier, a correspondingly large distance can be achieved. This distance has the result that during compression movements, a correspondingly large twisting of the torsion bar stabilizer around its longitudinal axis takes place, making it possible, as opposed to the torsion bar stabilizer of the known motor vehicle axle, to achieve a higher stiffness against torsion by using a torsion bar of a reduced diameter. In addition to a better utilization of material, this also makes possible a reduction of the weight of the stabilizer.

In other specially preferred embodiments, the stabilizer legs are connected directly to the wheel carriers, and thus, the elasticities are eliminated which exist in stabilizer arrangements between the wheel carriers and the lower spring links, as well as, between these elements and the stabilizer legs. These elasticities are the cause of the size of a torsion angle or a transmission ratio which is smaller relative to the actually occurring excursion or compression movement of the spring links and the wheel carriers.

Further objects, features, and advantages of the present invention will become more apparent from the following description when taken with the accompanying drawings which show, for purposes of illustration only, an embodiment in accordance with the present invention.

BRIEF DESCRIPTION OF THE DRAWINGS

FIG. 2 is a rear schematic view of the torsion bar stabilizer arrangement in accordance with FIG. 1.

DETAILED DESCRIPTION OF THE DRAWINGS

Figure 1:
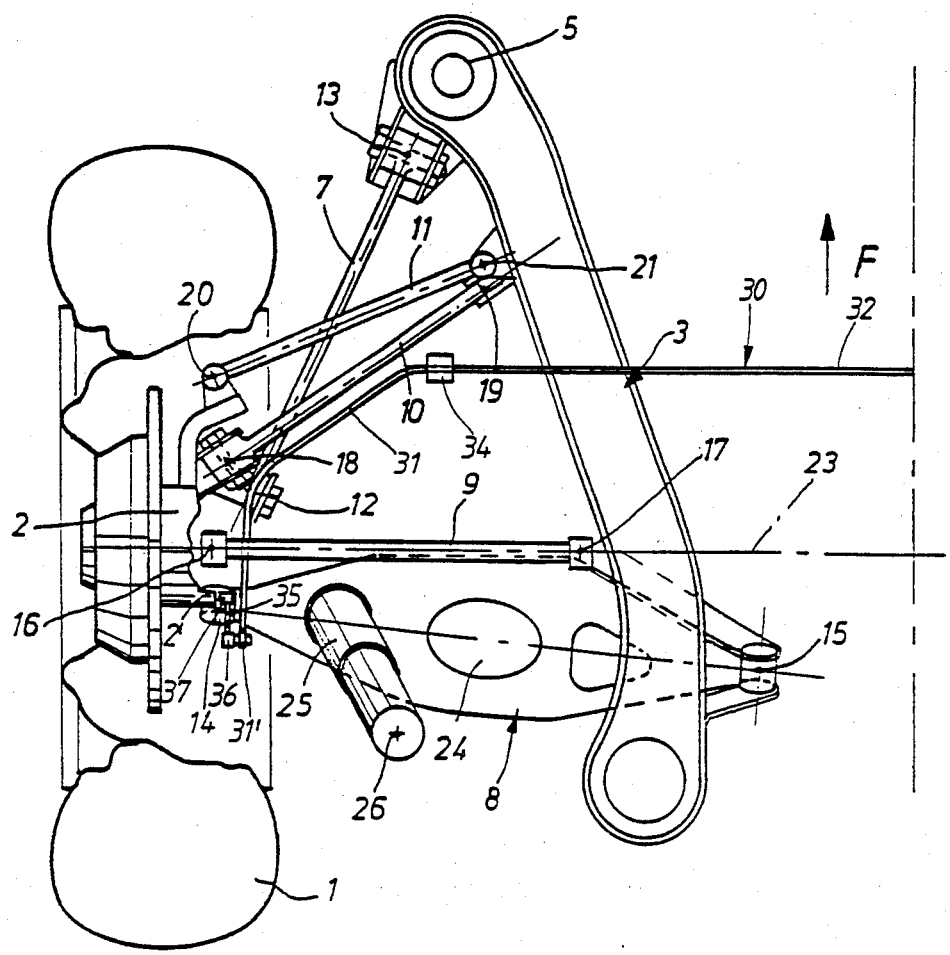
FIG. 1 is a top schematic view of a torsion bar stabilizer arrangement constructed in accordance with a preferred embodiment of the present invention.

The wheel suspension for a driven rear wheel 1 of a passenger car includes guiding members for the rear wheel 1, which further include four individual links. These individual links are coupled to a wheel carrier 2 on the side of the wheel which is only partially outlined and on the side of the body, to a carrying body 3 which itself is elastically connected with the vehicle body 4.

The support of the carrying body 3 at the vehicle body 4 takes place via elastic elements 5 and 6, wherein a pot-shaped receiving means at the vehicle body 4 is located.

Of the individual links which provide the guiding of the wheels, a compression strut 7 extending diagonally to the front and on the inside and a control arm serving as a spring link 8, form the lower coupling for the wheel carrier 2. The upper coupling for the wheel carrier is formed by a camber strut 9 extending in transverse direction and a tension strut 10 extending diagonally toward the front and on the inside. Additionally, a tie rod 11 is coupled at the wheel carrier 2 which in the upper position extends between the compression strut 7 and the tension strut 10. The tie rod 11 further crosses the compression strut 7 in top view and extends transversely steeper toward the inside than the tension strut 10.

The coupling point on the side of the wheel carrier for the compression strut 7 has the reference number 12 and the coupling point on the side of the body has the reference number 13. The corresponding coupling points for the spring link 8 have the numbers 14 and 15. The camber strut 9 has a coupling point 16 on the side of the wheel carrier and a coupling point 17 on the side of the body. At the tension strut 10, the corresponding coupling points have the reference number 18 and 19. Finally, the tie rod 11 on the side of the wheel carrier is held by a coupling point 20 and on the side of the body by a coupling point 21. All coupling points on the side of the body are located at the carrying body 3 shown partially in detail.

In FIG. 2, the spring link 8 is shown extending almost horizontally with a slight slope toward the outside and downward. As shown in FIG. 1, the spring link 8 has its axis determined by its coupling points 14 and 15. Originating from its coupling point 14 on the side of the wheel carrier, the spring link 8 extends slightly diagonally toward the rear and the inside. The camber strut 9, in rear view, extends almost horizontally and in FIG. 1 is located essentially in the wheel center transverse plane 23. The coupling point 14 of the spring link 8 on the side of the wheel carier, is arranged slightly set back with respect to the wheel center transverse plane 23.

Additionally, according to FIG. 1, the coupling point 12 of the compression strut 7, as seen in driving direction F, is located in front of the wheel center transverse plane 23 and at a distance to the plane which corresponds approximately to the distance of the coupling point 14 of the spring link 8 on the side of the wheel carrier with respect to the transverse plane.

The coupling point 18 of the tension strut 10 is located at a larger distance to the wheel center transverse plane 23. This coupling point 18 is essentially located in the center between the coupling point 20 of the tie rod 11 on the side of the wheel carrier and the corresponding coupling point 12 of the compression strut 7.

As shown in FIG. 2, the coupling point 12 of the compression strut 7 is located at the lowest vertical position as compared with the other coupling points on the side of the wheel carrier. Listing the remaining coupling points at the wheel carrier 2 in sequential order from the coupling point 12 of the compression strut 7 are the coupling point 14 of the spring link 8, the coupling point 20 of the tie rod 11, the coupling point 18 of the tension strut 10 and the coupling point 16 of the camber strut 9.

On the spring link 8, a spring (not shown) positioned at 24 and the shock absorber 25 are supported symmetrically to the axis of the spring link determined by the coupling points 14 and 15. The bearings provided in the coupling points 14 and 15 of the spring link 8 have pivotal shafts which are sloped diagonally toward the rear and downward. As a result of the positioning of the coil spring (not shown) at 24 and the shock absorber 25, a longitudinal axis 26 results which extends diagonally toward the rear and upward with respect to the shock absorber 25.

According to FIG. 2, an axle shaft 28 leading to the wheel carrier 2 is arranged at a radial distance to the spring link 8 as well as to the camber strut 9. A joint U-shaped torsion bar stabilizer 30 is arranged at both wheel suspensions with a bar-shaped intermediate piece 32 of the stabilizer 30 connecting the U-shaped legs 31 with one another and extending in transverse direction of the vehicle. The legs 31 are rotatably held at the vehicle body 4 as viewed in the driving direction in front of the wheel center transverse plane 23 by means, for example, of rubber elements 34.

The torsion bar stabilizer 30 or its bar-shaped intermediate piece 32 is, therefore, located between the vehicle body 4 and the carrying bodies 3 of the wheel suspensions and extends in the direction of the rear wheel 1 in each case laterally beyond the two carrying bodies 3.

As shown in FIGS. 1 and 2, the legs 31 of the torsion bar stabilizer cross the camber strut 9 and the axle shaft 28 of the wheel suspensions and extend through in vertical direction at a distance between the camber strut 9 and the axle shaft 28. In this case, the free end pieces 31' of the stabilizer legs 31 are located at a distance above the spring links 8. The leg end pieces 31' are movably supported by means of a ball-and-socket joint 36 at a transmission rod 35. The rod 35 is provided between end pieces 31' and the spring link 8, with the lower end of the rod 35 also being supported by means of a ball-and-socket joint 37 on the side of the spring link. The support of the stabilizer legs may, however, also be implemented in other ways.

The transmission rod 35 according to FIG. 1, is located at a radial lateral distance to the axle shaft 28 and behind the wheel center transverse plane 23 as seen in the driving direction F. The ball-and-socket joint 37 in this case is provided directly at the lower bearing lug 2' of the wheel carrier 2 and above the coupling point 14 of the spring link 8 on the side that is opposite the shock absorber 25.

The housing of the stabilizer legs 31 at a radial distance between the camber strut 9 and the axle shafts 28 of both wheel suspensions permits an arrangement of the torsion bar stabilizer such that in an upward direction little space is required, while the area behind and above the wheel carrier is kept free by the stabilizer legs 31. Thus the stabilizer legs do not present any limitation of width for the rear wheel 1 positioned at the wheel carrier 2. In this case, the stabilizer legs 31 may be brought as close to the wheel carriers 2 as possible, and as a result, the transmission ratio of the torsion bar stabilizer may be optimally designed. This is also promoted by the direct connecting of the transmission rod 35 at the bearing lug 2' of the wheel carrier 2 because the elasticity of the wheel carrier bearing lug 2' or the spring link coupling point 14 can no longer disadvantageously affect the transmission.

As shown in FIG. 1, the legs 31 of the torsion bar stabilizer extend at least over part of their length in parallel to the tension strut 10, and may therefore, with their leg end pieces 31' supported at the respective spring links 8, be provided as closely at the respective wheel carriers 2 as possible.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A stabilizer arrangement for motor vehicle axles having independent wheel suspensions for wheels which can be driven via axle shafts extending in a transverse direction of the vehicle, wherein said driven wheel has a wheel guiding means comprising a wheel carrier means and plural individual link means connected between the body of the vehicle and said wheel carrier for guiding said wheel carrier means; said individual link means including a lower spring link to which a carrying spring and a shock absorber are attached; an upper camber strut; an axle shaft being located vertically between said lower spring link and said upper camber strut; said lower spring link and said upper camber strut extending transversely of the vehicle and vertically above legs of a U-shaped torsion bar stabilizer means pivoted to a body portion of said motor vehicle; said U-shaped torsion bar stabilizer means extending transversely of said vehicle; said legs of said U-shaped torsion bar being located vertically higher than the axle shafts in an area close to the driven wheel and being connected to the wheel carrier outboard of the shock absorber; the legs of the torsion bar stabilizer being located to extend generally longitudinally of the vehicle between the camber strut and the axle shaft and extending, at least over a partial section of their length, essentially in parallel to a third individual link connected between the body of the vehicle and the wheel carrier for additionally guiding said wheel carrier of the wheel suspension; and wherein said third individual link is adjacent to the U-shaped legs and being located approximately at their level.

2. An arrangement according to claim 1, wherein ends of the legs of the U-shaped stabilizer means are supported at the wheel carrier on the same side of the carrier as the spring link is connected.

3. Arrangement according to claim 1, wherein the stabilizer leg means, as viewed in top view, crosses the camber strut means and is connected to the wheel carrier rearwardly of the camber strut means.

4. Arrangement according to claim 1, wherein the torsion bar stabilizer means is disposed, at least in the area adjacent the wheel carrier, at a level below the connection of the tension third individual link means to the wheel carrier means.

5. The arrangement according to claim 1, wherein the stabilizer leg means include leg end pieces on the side of said lower spring link means, said end pieces being supported at said wheel carrier means.

* * * * *